(12) United States Patent
Walsh

(10) Patent No.: US 7,236,849 B2
(45) Date of Patent: Jun. 26, 2007

(54) SAFETY SYSTEM FOR POWER EQUIPMENT

(76) Inventor: Matthew J. Walsh, 307 E. Old Country Rd., Hicksville, NY (US) 11801

( * ) Notice: Subject to any disclaimer, the term of this patent is extended or adjusted under 35 U.S.C. 154(b) by 697 days.

(21) Appl. No.: 10/785,295

(22) Filed: Feb. 23, 2004

(65) Prior Publication Data

US 2005/0184596 A1  Aug. 25, 2005

(51) Int. Cl.
*G06F 19/00* (2006.01)
*B26D 5/38* (2006.01)
*B23Q 11/00* (2006.01)
*F16P 3/18* (2006.01)

(52) U.S. Cl. .................. 700/177; 83/370; 409/134; 100/344; 192/131 R

(58) Field of Classification Search ............... 700/177, 700/178; 83/370; 173/30; 307/326; 340/532; 483/2; 409/134; 408/710; 100/341–344; 192/129 R–131 H
See application file for complete search history.

(56) References Cited

U.S. PATENT DOCUMENTS

| | | | | |
|---|---|---|---|---|
| 4,493,377 A * | 1/1985 | Gunther et al. | ............. | 173/170 |
| 4,621,300 A * | 11/1986 | Summerer | .................. | 361/175 |
| 4,914,721 A * | 4/1990 | Glaeser et al. | ............. | 307/116 |
| 4,965,909 A * | 10/1990 | McCullough et al. | ... | 192/131 R |
| 5,014,154 A * | 5/1991 | White | ......................... | 361/49 |
| 5,025,175 A * | 6/1991 | Dubois, III | ................ | 307/326 |
| 5,160,289 A * | 11/1992 | DuBois, III | ................ | 452/127 |
| 5,198,702 A * | 3/1993 | McCullough et al. | ....... | 307/326 |
| 5,272,946 A * | 12/1993 | McCullough et al. | .......... | 83/58 |
| 5,396,222 A * | 3/1995 | Kus et al. | ................... | 340/679 |
| 5,510,685 A * | 4/1996 | Grasselli | .................... | 318/434 |
| 5,669,809 A * | 9/1997 | Townsend | ................... | 452/125 |
| 6,392,169 B1 * | 5/2002 | Linger et al. | ........... | 200/42.01 |
| 6,856,852 B1 * | 2/2005 | Bruinsma et al. | .......... | 700/177 |
| 7,049,967 B2 * | 5/2006 | Grasselli et al. | ......... | 340/573.1 |
| 7,055,417 B1 * | 6/2006 | Gass | .............................. | 83/58 |
| 7,124,872 B2 * | 10/2006 | Poser | ........................ | 192/130 |
| 2004/0244091 A1 * | 12/2004 | Parren | ........................ | 2/161.6 |
| 2005/0026643 A1 * | 2/2005 | White et al. | ............ | 455/550.1 |

FOREIGN PATENT DOCUMENTS

| | | |
|---|---|---|
| DE | 3501021 A1 * | 7/1985 |
| DE | 3937684 A1 * | 5/1991 |
| FR | 2712837 A1 * | 6/1995 |
| NL | 1005315 C * | 8/1998 |

* cited by examiner

*Primary Examiner*—M. N. Von Buhr
(74) *Attorney, Agent, or Firm*—Charles E. Baxley

(57) ABSTRACT

Apparatus and method is disclosed for providing a safety system for power equipment comprising a machine having a lower tool, an upper tool, and a safety controller. The lower tool is electrically isolated from the reversible upper tool. A safety controller is coupled to the lower tool. A pair of electrically conductive gloves that are coupled to the safety controller are worn by an operator of the power equipment. Electrically conductive stock is held with the pair of electrically conductive gloves, the safety controller allowing the machine to operate when the electrically conductive stock contacts the lower tool.

14 Claims, 1 Drawing Sheet

SAFETY SYSTEM FOR POWER EQUIPMENT

FIELD OF THE INVENTION

This invention relates to the field of safety and more particularly to safety systems for power equipment.

BACKGROUND OF THE INVENTION

Power equipment can cause severe injury to an operator whose hands or body come in contact with the equipment during its operations. Safety devices or systems have been used to protect the operator by disabling the power equipment if it is used in a potentially unsafe manner. While these devices are effective at protecting the operator, the safety devices oftentimes put restrictions on the use of equipment in instances where the operator's safety is not compromised, thereby decreasing productivity.

One set of safety devices creates a barrier between the operator and the processing portion of the power equipment. Machines of this type are guarded with fixed barriers or mechanical hold back or pull back devices. These systems prohibit the user from holding the part or stock to be processed.

Another set of safety devices work as intrusion detectors. Machines of this type use sensors to detect when an object, presumably a body part, enters a zone designated as unsafe. The machine is disabled when such an object is detected. However, parts or stock can also be detected, causing the machine to be blocked out even when there is no danger to the operator.

Accordingly, there is a need to provide a safety system for power equipment that improves productivity by allowing the operator to hold and manipulate the stock while remaining safe from injury.

SUMMARY OF THE INVENTION

The present invention teaches a safety system for power equipment. The disclosed invention provides a machine having a lower tool and an upper tool. The lower tool is electrically isolated from the upper tool. A safety controller is coupled to the lower tool. An operator wears a pair of electrically conductive gloves that are coupled to the safety controller. When the operator holds a piece of electrically conductive stock and contacts the lower tool, the safety controller enables the machine to operate.

In an exemplary embodiment of the present invention, the safety controller includes a safety sensor to detect when the upper tool contacts the electrically conductive gloves or stock. Upon detecting contact, the safety sensor immediately pauses operation of the machine. By further including a processing sensor in the safety controller, the safety system enables the machine to complete the processing of the electrically conductive stock after the pause if the operator's electrically conductive gloves are released from the electrically conductive stock. Thus, the only way the stock can be processed by the machine is when the operator is no longer holding onto it and is safe from harm. Further protection is found in the processing sensor by disabling operation of the machine after the pause if the operator continues to hold onto the electrically conductive stock or if the operator's electrically conductive gloves contact the machine or electrically conductive stock during the processing completion.

In another exemplary embodiment of the present invention, the safety controller further includes a first timing sensor that disables operation of the machine when there is a delay between the operator holding onto the electrically conductive stock with one hand and holding onto the electrically conductive stock with the other hand. Thus, the machine only functions when the operator is safely holding onto the electrically conductive stock with two hands.

In another exemplary embodiment of the present invention, the safety controller includes a second timing sensor to vary the length of operation of the upper tool. This allows the present invention to provide the operator with the ability to vary the length of a stroke or other function.

Advantageously, the present invention can be used to improve the safety and productivity in many types of power equipment, including hydraulic and electric power machines. By designing the safety system with a flexible control system, the present invention can be employed on many machines where providing the operator with access to the stock to be processed can improve the quality of the work and increase productivity. Importantly, this improved access does not compromise safety at any point in the processing cycle. The present invention is a powerful solution to improving the safety and efficiency of power equipment.

BRIEF DESCRIPTION OF THE DRAWINGS

A more complete understanding of the present invention may be obtained from consideration of the following description in conjunction with the drawing in which.

DETAILED DESCRIPTION

Figure 1:
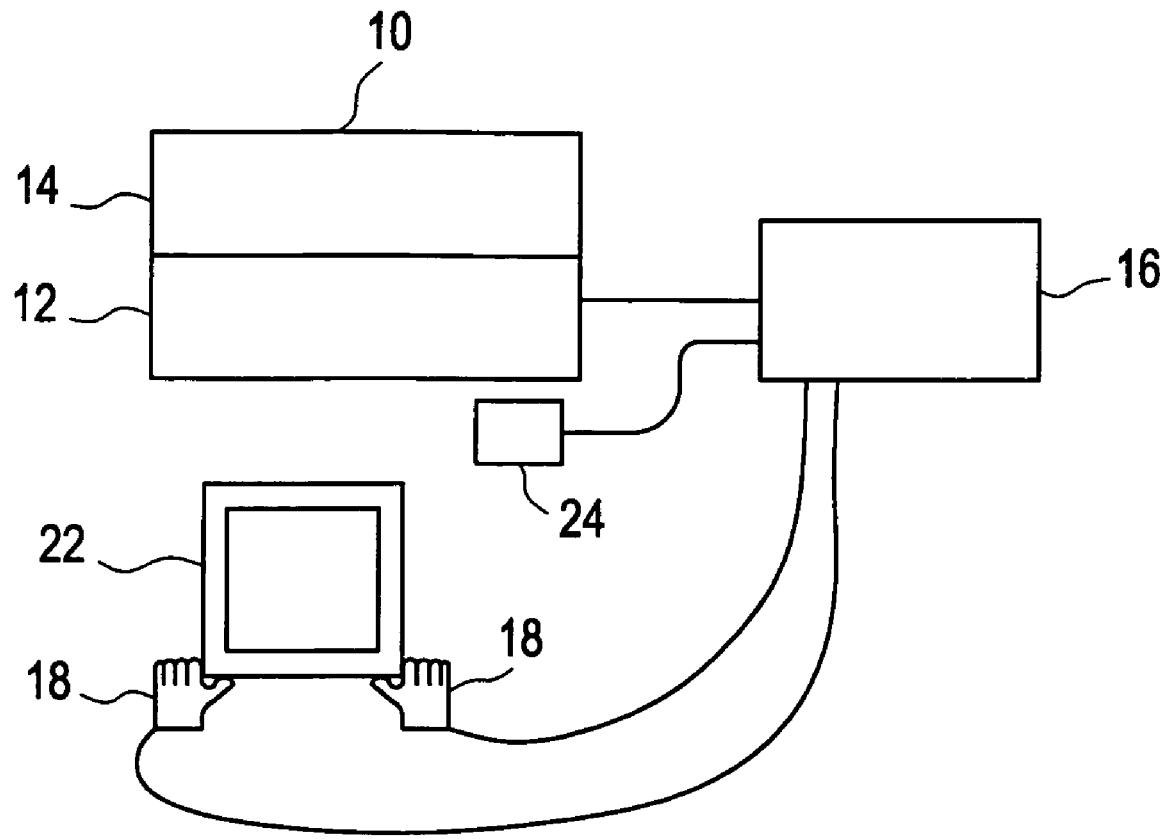
FIG. 1 is an illustration of the safety system for power equipment.

The exemplary safety system for power equipment can be seen in FIG. 1. The safety system comprises a plurality of components including upper and lower tools, a safety controller, and electrically conductive gloves. These components are integrated to achieve the desired objective of providing a safe and productive environment to employ power equipment.

The exemplary safety system for power equipment includes a machine 10 having a lower tool 12 and an upper tool 14. The lower tool 12 must be electrically isolated from the upper tool 14. A safety controller 16 is coupled to the lower tool 12. The operator wears a pair of gloves 18 that are made of an electrically conductive material. The gloves 18 are coupled to the safety controller 16. A preferred coupling is made with standard wiring.

In order to process materials in the machine 10, the operator must hold electrically conductive stock 22 with both gloves 18. The electrically conductive stock 22 is generally metal stock that is ready to be machined. After grasping the electrically conductive stock 22, the operator places the electrically conductive stock on the lower tool 12. This completes a circuit loop from the safety controller 16, to the gloves 18, to the electrically conductive stock 22, to the lower tool 12, and finally back to the safety controller 16. The safety controller 16 is initiated at the recognition of this circuit completion and thereafter allows the machine 10 to operate. The functioning of the machine 10 can be automatic or manual, whereby the operator would need to actuate a foot pedal or similar device to operate the machine 10.

Figure 2:
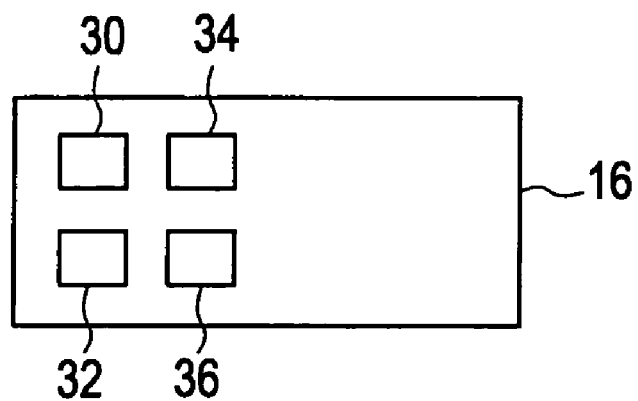
FIG. 2 is an illustration of an exemplary safety controller.

In an exemplary embodiment of the present invention as seen in FIG. 2, the safety controller 16 includes a safety sensor 30 to detect when the upper tool 14 contacts the gloves 18 or the electrically conductive stock 22. Because the upper tool 14 is electrically isolated from the lower tool 12, when the upper tool 14 contacts the gloves 18 or electrically conductive stock 22, there is a change in the circuit levels, triggering the safety sensor 30 to pause the machine 10. Thus, when detection is made, the electrically conductive part 22 is pinched between the upper tool 14 and the lower tool 12.

The safety controller 16 can further include a processing sensor 32 that is activated upon the electrically conductive part 22 becoming pinched between the upper tool 14 and the lower tool 12. The processing sensor 32 determines if the operator has released the electrically conductive stock 22. Upon recognizing that the gloves are no longer in contact with the electrically conductive stock 22, the processing sensor allows the machine 10 to initiate and complete the processing or machining of the electrically conductive stock 22. However, if the operator remains in contact with the electrically conductive stock 22, the processing sensor 32 disables the machine 10. Alternatively, if the machine processing has begun and the operator contacts the electrically conductive stock 22 or the machine 10, the processing sensor 32 disables the machine 10. When the processing is fully complete, the upper tool 14 and lower tool 12 separate, at which time, the operator can grab the electrically conductive stock 22. Thus, the machine only functions when the operator is no longer in contact with the electrically conductive stock 22, thereby improving safety conditions. Because the operator can only handle the electrically conductive stock 22 when there is no potential danger, processing quality is improved and no concessions are made to operator safety.

If the electrically conductive stock 22 is too small to hold with both gloves 18, the present invention is responsive to one of the pair of gloves 18 grasping the electrically conductive stock 22 while the other of the pair of gloves 18 is contacting a secondary safety station 24. The secondary safety station 24 is coupled to the safety controller 16 and is positioned near the lower tool 12 such that the electrically conductive stock 22 can be grasped by one of the pair of gloves 18 and placed by the operator onto the lower tool 12 while the operator's other hand is in contact through the other of the pair of gloves 18 with the secondary safety station 24. This keeps the hand that is not grasping the small piece of electrically conductive stock 22 from any potential harm.

In an exemplary embodiment of the present invention, the safety controller 16 includes a first timing sensor 34. In one instance, the first timing sensor 34 insures that the operator is holding the electrically conductive stock 22 with both gloves 18 and that there is an acceptable period of time between grasping the electrically conductive stock 22 with one of the pair of gloves 18 and grasping it with the other glove 18. If the operator holds onto the electrically conductive stock 22 with only one hand for an excessive length of time, the first timing sensor 34 is triggered and the machine 10 is disabled. Alternatively, the first timing sensor 34 insures that the operator is holding the electrically conductive stock 22 with one of the pair of gloves 18 and contacting the secondary safety station 24 with the other of the pair of gloves 18 and that there is an acceptable period of time between the two events. If the operator contacts only the electrically conductive stock 22 or only the secondary safety station 24 for an excessive length of time, the first timing sensor 34 is triggered and the machine 10 is disabled. A preferred first timing sensor 34 is a timer relay that is tripped when the delay is excessive. This prevents the operator from having any freedom with hand movements that can result in potential harm.

In an exemplary embodiment of the present invention, the safety controller 16 includes a second timing sensor 36. The second timing sensor 36 controls the length of operation of the upper tool 14. For some type of power equipment such as press brakes, the second timing sensor can be used to vary the length of the stroke of the upper tool 14.

It will be understood that the embodiment of the present invention specifically shown and described is merely exemplary and that a person skilled in the art can make alternate embodiments using different configurations and functionally equivalent components. All such alternate embodiments are intended to be included in the scope of this invention as set forth in the following claims.

What is claimed:

1. A safety system for power equipment comprising:
    a machine having a lower tool and an upper tool, said lower tool being electrically isolated from said upper tool;
    a safety controller coupled to said lower tool;
    a pair of electrically conductive gloves that are coupled to said safety controller, said electrically conductive gloves to be worn by an operator of said power equipment; and
    electrically conductive stock to be held with said pair of electrically conductive gloves, said safety controller allowing said machine to operate when said electrically conductive stock contacts said lower tool.

2. The safety system according to claim 1, wherein said safety controller further comprises a safety sensor to detect said upper tool contacting said electrically conductive gloves or stock, said safety sensor pausing operation of said machine after said detection.

3. The safety system according to claim 2, wherein said safety controller further comprises a processing sensor, said processing sensor enabling continued operation of said machine after said pausing if said electrically conductive gloves are released from said electrically conductive stock and said processing sensor disabling operation of said machine after said pausing if said electrically conductive gloves remain in contact with said electrically conductive stock or if said electrically conductive gloves contact said machine or said electrically conductive stock after said continued operation.

4. The safety system according to claim 1, wherein said safety controller further comprises a first timing sensor, said first timing sensor disabling operation of said machine when there is a delay between holding said electrically conductive stock with one of said pair of electrically conductive gloves and holding said electrically conductive stock with the other of said pair of electrically conductive gloves.

5. The safety system according to claim 1, wherein said safety controller further comprises a second timing sensor, said second timing sensor varying the length of operation of said upper tool.

6. The safety system according to claim 1, further including a secondary safety station coupled to said safety controller, said secondary safety station allowing said machine to operate when one of said pair of electrically conductive gloves contacts said secondary safety station while the other of said pair of safety gloves holds said electrically conductive stock and said electrically conductive stock contacts said lower tool.

7. The safety system according to claim 6, wherein said safety controller further comprises a first timing sensor, said first timing sensor disabling operation of said machine when there is a delay between holding said electrically conductive stock with one of said pair of electrically conductive gloves and contacting said secondary safety station with the other of said pair of electrically conductive gloves.

8. A method for controlling the safety of power equipment, comprising the steps of:
   electrically isolating a lower tool of a machine from an upper tool of said machine;
   providing a safety controller coupled to said lower tool;
   providing a pair of electrically conductive gloves coupled to said safety controller, said electrically conductive gloves to be worn by an operator of said power equipment;
   holding electrically conductive stock with said pair of electrically conductive gloves; and
   allowing said machine to operate when said electrically conductive stock contacts said lower tool.

9. The method according to claim 8, further including the steps of:
   detecting with a safety sensor when said upper tool contacts said electrically conductive gloves or stock; and
   pausing operation of said machine after said detection step.

10. The method according to claim 9, further including the steps of:
    enabling continued operation of said machine after said pausing step if said electrically conductive gloves are released from said electrically conductive stock;
    disabling operation of said machine after said pausing step if said electrically conductive gloves remain in contact with said electrically conductive stock or if said electrically conductive gloves contact said machine or said electrically conductive stock after said continued operation step.

11. The method according to claim 8, further including the step of providing a first timing sensor, said first timing sensor disabling operation of said machine when there is a delay between holding said electrically conductive stock with one of said pair of electrically conductive gloves and holding said electrically conductive stock with the other of said pair of electrically conductive gloves.

12. The method according to claim 8, further including the step of providing a second timing sensor, said second timing sensor varying the length of operation of said upper tool.

13. The method according to claim 8, wherein the electrically conductive stock can be held with one of said pair of electrically conductive gloves if the other of said pair of electrically conductive gloves is contacting a secondary safety station, said secondary safety station coupled to said safety controller.

14. The method according to claim 13, further including the step of providing a first timing sensor, said first timing sensor disabling operation of said machine when there is a delay between holding said electrically conductive stock with one of said pair of electrically conductive gloves and contacting said secondary safety station with the other of said pair of electrically conductive gloves.

* * * * *